US012462630B2

(12) United States Patent
Quaranta et al.

(10) Patent No.: US 12,462,630 B2
(45) Date of Patent: Nov. 4, 2025

(54) LOTTERY TICKET VENDING MACHINE

(71) Applicant: Brightstar Global Solutions Corporation, Providence, RI (US)

(72) Inventors: Thomas Quaranta, North Kingstown, RI (US); Paul A. Bucci, Glocester, RI (US); John Tavares, West Warwick, RI (US); Stewart Thoeni, Reno, NV (US)

(73) Assignee: BRIGHTSTAR GLOBAL SOLUTIONS CORPORATION, Providence, RI (US)

( * ) Notice: Subject to any disclaimer, the term of this patent is extended or adjusted under 35 U.S.C. 154(b) by 194 days.

(21) Appl. No.: 18/480,804

(22) Filed: Oct. 4, 2023

(65) Prior Publication Data

US 2025/0118126 A1 Apr. 10, 2025

(51) Int. Cl.

*G07C 15/00* (2006.01)
*G07F 17/32* (2006.01)
*G07F 17/42* (2006.01)

(52) U.S. Cl.

CPC ......... *G07C 15/005* (2013.01); *G07F 17/329* (2013.01); *G07F 17/42* (2013.01)

(58) Field of Classification Search

CPC ...... G07C 15/005; G07F 17/329; G07F 17/42
See application file for complete search history.

(56) References Cited

U.S. PATENT DOCUMENTS

| | | | | |
|---|---|---|---|---|
| 3,855,457 | A | 12/1974 | Amundson et al. | |
| 5,222,624 | A | 6/1993 | Burr | |
| 5,268,561 | A * | 12/1993 | Kimura | G07B 1/00 235/449 |
| 5,408,417 | A | 4/1995 | Wilder | |
| 5,611,456 | A | 3/1997 | Kasper | |
| 5,836,498 | A | 11/1998 | Turek | |
| 6,609,644 | B1 | 8/2003 | Menna | |
| 6,712,253 | B2 | 3/2004 | Hargrave et al. | |
| 6,714,838 | B2 | 3/2004 | Scrymgeour et al. | |
| 6,726,077 | B2 | 4/2004 | Roberts et al. | |
| 7,032,774 | B2 | 4/2006 | Boehm et al. | |

(Continued)

FOREIGN PATENT DOCUMENTS

| | | | | |
|---|---|---|---|---|
| CA | 2522369 A1 | 4/2006 | | |
| CN | 217443917 U | 9/2022 | | |
| WO | WO-2004099915 A2 * | 11/2004 | | G07F 17/42 |

OTHER PUBLICATIONS

"Extended European Search Report", from corresponding European Patent Application No. EP24202530.2, Nov. 21, 2024.

*Primary Examiner* — Michael G Lee
(74) *Attorney, Agent, or Firm* — Neal, Gerber & Eisenberg LLP

(57) ABSTRACT

A lottery ticket vending machine including a ticket collection receptacle of its front door that is configured to receive lottery tickets of different sizes and shapes. The ticket collection receptacle includes a first ticket-receipt section, a second ticket-receipt section, and a third ticket-holding-and-access section. The first ticket-receipt section is configured to receive instant lottery tickets from the bursters. The second ticket-receipt section is configured to receive printed lottery tickets (and/or receipts) from the printer. The third ticket-holding-and-access section is configured to hold the received lottery tickets (and receipts) in a manner that does not block receipt of further tickets (and receipts).

20 Claims, 15 Drawing Sheets

(56) References Cited

U.S. PATENT DOCUMENTS

| | | | |
|---|---|---|---|
| 7,383,099 | B2 | 6/2008 | Pollard et al. |
| 7,562,798 | B2 | 7/2009 | Bartolone et al. |
| 7,665,394 | B2 | 2/2010 | Roberts et al. |
| 7,850,257 | B2 | 12/2010 | Roberts et al. |
| 8,127,973 | B2 | 3/2012 | Mirkovic et al. |
| 8,192,268 | B1 | 6/2012 | Karpe |
| 8,210,921 | B1 | 7/2012 | Karpe |
| 8,534,524 | B2 | 9/2013 | Businger et al. |
| 8,550,294 | B2 | 10/2013 | Martin |
| 9,613,337 | B1 | 4/2017 | Garrison |
| 9,685,026 | B1 | 6/2017 | Garrison |
| 10,438,452 | B2 | 10/2019 | Ferron et al. |
| 11,010,987 | B2 | 5/2021 | Bucci |
| 2003/0120381 | A1 | 6/2003 | Perin et al. |
| 2004/0000572 | A1 | 1/2004 | Engelhardt, Jr. et al. |
| 2004/0254008 | A1* | 12/2004 | Anderson ............ G07C 15/005 463/17 |
| 2005/0178810 | A1 | 8/2005 | Woods et al. |
| 2007/0017978 | A1 | 1/2007 | Ho |
| 2007/0088459 | A1 | 4/2007 | Pollard et al. |
| 2010/0308071 | A1 | 12/2010 | Businger |
| 2014/0008407 | A1 | 1/2014 | Bucci et al. |
| 2016/0232741 | A1 | 8/2016 | Assis et al. |
| 2022/0108562 | A1 | 4/2022 | Claude et al. |
| 2022/0114841 | A1 | 4/2022 | Mejenborg et al. |
| 2022/0114842 | A1 | 4/2022 | Mejenborg et al. |
| 2022/0114860 | A1 | 4/2022 | Mejenborg et al. |
| 2024/0021054 | A1 | 1/2024 | Topalian et al. |

* cited by examiner

LOTTERY TICKET VENDING MACHINE

CROSS-REFERENCE TO RELATED APPLICATION

This application is related to the following commonly owned co-pending patent application: U.S. application Ser. No. 18/188,901, entitled "LOTTERY TICKET VENDING MACHINE,".

BACKGROUND

The present disclosure relates to lottery ticket vending machines.

Lottery tickets such as instant lottery tickets may be printed on a long strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including a machine housing including an openable front door, wherein the front door includes a ticket collection receptacle having a first ticket-receipt section defining a first ticket receiving slot, a second ticket-receipt section defining a second ticket receiving slot, and a third ticket-holding-and-access section defining a ticket retrieval slot, wherein the second ticket-receipt section and the third ticket-holding-and-access section include a plurality of walls formed from a sheet metal with a grain extending in an upright direction. The lottery ticket vending machine further includes a ticket drawer column in the machine housing, the ticket drawer column including a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

In various other embodiments, the present disclosure relates to a lottery ticket vending machine including a machine housing including an openable front door, the front door comprising a ticket collection receptacle including: a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, and a third top wall connected to and extending inwardly from the third front wall, the third top wall connected to and the first rear wall, and wherein the first rear wall is connected to extends downwardly from the third top wall. The lottery ticket vending machine also includes a ticket drawer column in the machine housing, the ticket drawer column comprising a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

In various other embodiments, the present disclosure relates to a lottery ticket vending machine including a machine housing comprising an openable front door, wherein the front door includes a ticket collection receptacle having: a ticket-receipt section and a ticket-holding-and-access section that are formed by: a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, a third top wall connected to and extending inwardly from the third front wall, the third top wall connected to and the first rear wall, and wherein the first rear wall is connected to extends downwardly from the third top wall, and a downwardly extending angled ramp below the first ticket receiving slot, wherein the ramp is connected at a top portion and extends downwardly from an inner section of the second rear wall, wherein the ramp includes an upper section that is angled away from the second rear wall, and the ramp includes a lower section that is angled toward and extends toward the second rear wall. The lottery ticket vending machine further includes a ticket drawer column in the machine housing, the ticket drawer column including a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

Additional features are described in, and will be apparent from, the following Detailed Description and the figures.

DETAILED DESCRIPTION

Figure 1:
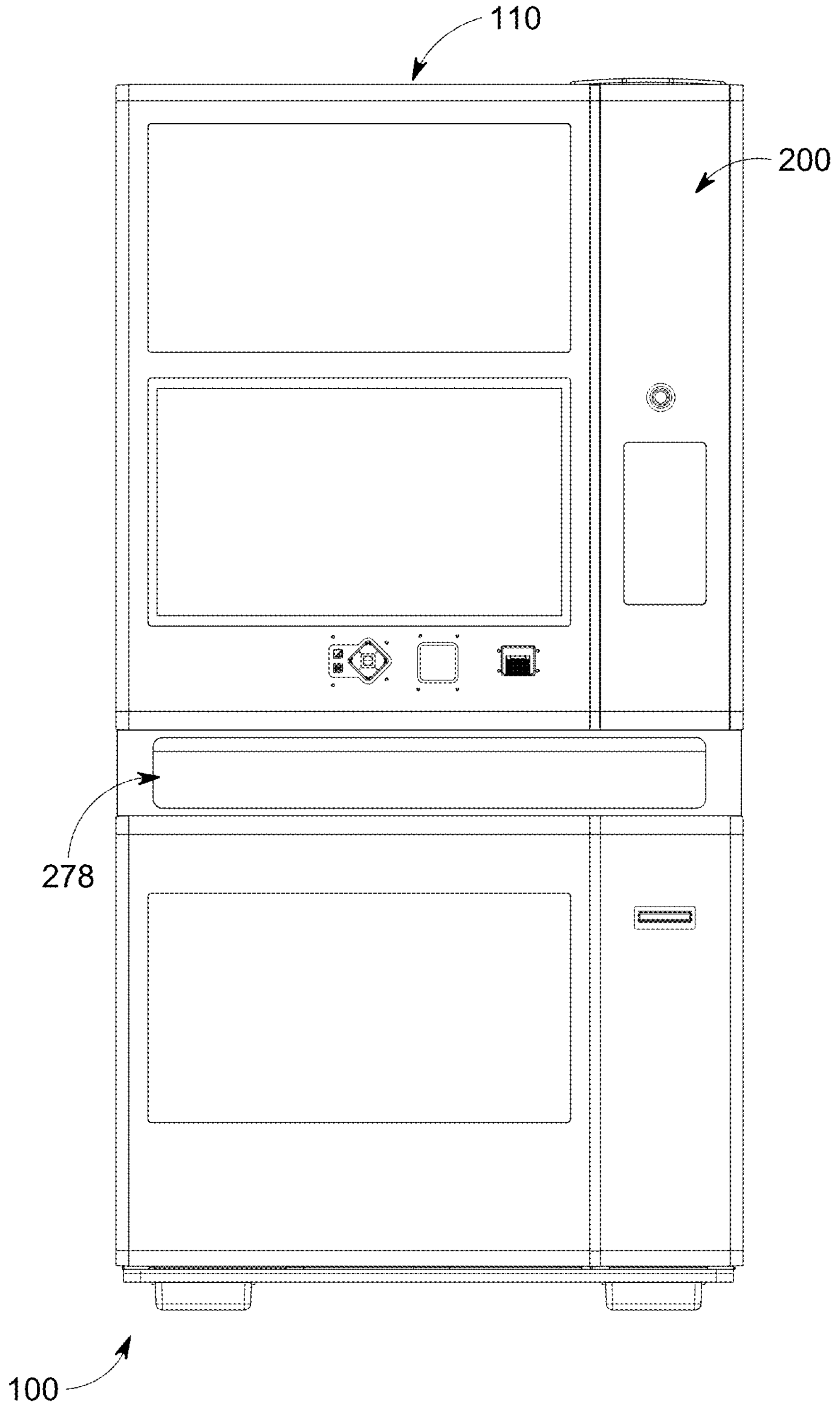
FIG. 1 is a front view of a lottery ticket vending machine of one example embodiment of the present disclosure shown with its front door in a closed position, wherein the front door includes a ticket retrieval slot that provides access to a ticket collection receptacle of the front door.

In various embodiments, the present disclosure relates to a lottery ticket vending machine that is configured to ensure proper delivery and receipt of lottery tickets into a ticket collection receptacle and access to the ticket collection receptacle by purchasers. In various embodiments, the ticket collection receptacle is configured to receive and hold lottery tickets of different sizes and different shapes without damage to such tickets.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies (such as from 2 to 4 inches) and a length that varies (such as from 2 to 12 inches). The term lottery ticket as used herein is intended to cover these various different types of instant lottery tickets and other types of lottery tickets that can be dispensed in a same or similar manner as these types of lottery tickets.

Various instant lottery tickets are often arranged after manufacture (which includes after complete printing) in instant lottery ticket packs for storage, organization, sorting, picking, shipping to instant lottery ticket distributors or ticket retailers, and validation. Instant lottery ticket packs can include a plurality of instant lottery tickets (that are all of the same type, same size, and for the same game(s)), and can be protected for storage and shipping by a transparent pack wrapping, such as transparent plastic wrapping, securely wrapped around the plurality of instant lottery tickets. A pack of instant lottery tickets can include all of the instant lottery tickets attached to each other but joined by perforations. Such instant lottery tickets of a pack can be detached from each other along such perforations. While the lottery tickets of each pack are often manufactured in a continuous strip that is fan-folded for convenient supply, the packs can be in other forms such as in a roll form. These packs in the fan-folded form or in the roll form are configured to be dispensed via an instant lottery ticket vending machine.

Lottery tickets of different sizes can be partially or fully straight, or for multiple different reasons, lottery tickets or parts thereof can be partially or fully curled, curved, or otherwise shaped at any one time. The lottery ticket vending machine including the ticket collection receptacle of the present disclosure is configured to receive lottery tickets of such different sizes and shapes without damage to such lottery ticket and particularly without damage to the SOC coatings of such lottery tickets.

Turning now to FIGS. 1 to 15, a lottery ticket vending machine of one example embodiment of the present disclosure is generally illustrated and indicated by numeral 100. The lottery ticket vending machine 100 may be referred to herein as the "vending machine" for brevity.

The illustrated example lottery ticket vending machine 100 generally includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 of the lottery ticket vending machine 100 includes a ticket collection receptacle 250 as further described herein. The quantity of ticket drawer columns and associated movable ticket bursters can vary in accordance with the present disclosure. The size of the ticket collection receptacle can vary based on the quantity of ticket draw columns.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not shown) positioned in and supported by the machine housing 110; and (2) various purchaser interface components (not labeled) that are part of the front door 200. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control(s) the operation of the ticket vending machine 100 including the movable ticket bursters 400*a*, 400*b*, and 400*c* as further discussed herein to facilitate the dispensing of each requested instant lottery ticket. The controller(s) can be any suitable type of controller (such as a programmable logic controller) that includes any suitable processing device (s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket vending machine 100. The purchaser interface components include one or more display devices, one or more input devices, and one or more payment acceptors. The purchaser interface components enable purchasers to use such components to determine the instant lottery tickets available from the ticket vending machine 100, and to select and pay for any of those instant lottery tickets held by the ticket vending machine 100 that the purchaser desires to obtain. The purchaser interface components can display images and information to inform purchasers of the different instant lottery tickets available from the ticket vending machine 100 and to assist in completing the selection and purchase of such instant lottery tickets. These purchaser interface components can take various different forms as well known in the industry, and are thus not described in detail herein for brevity.

Figure 2:
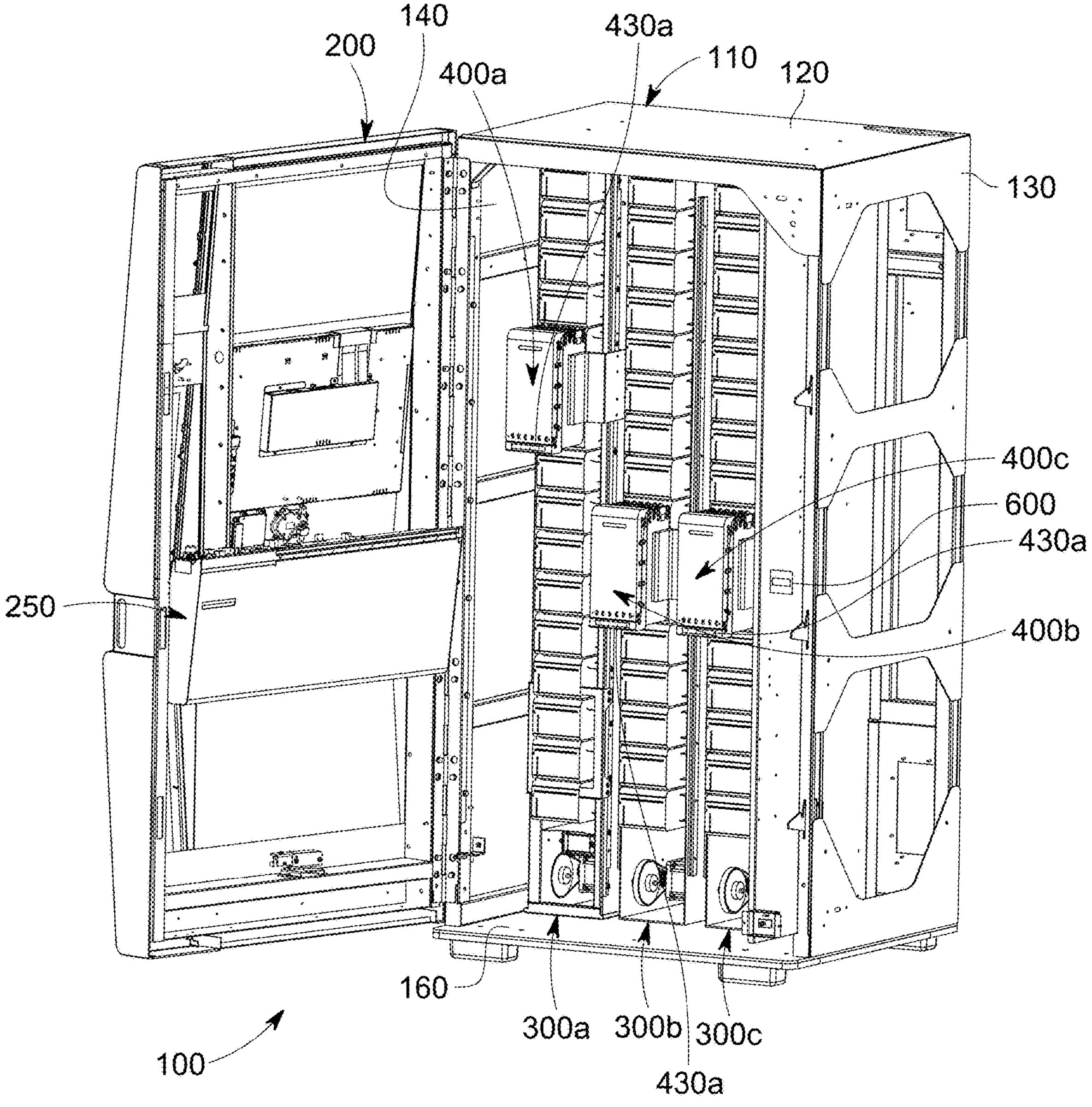
FIG. 2 is a front perspective view of the lottery ticket vending machine of FIG. 1 shown with the front door in an open position, shown with a left side wall outer panel removed, showing three ticket drawer columns and three movable ticket bursters respectively associated the three ticket drawer columns, and showing the rear side of the ticket collection receptacle of the front door.
Figure 3:
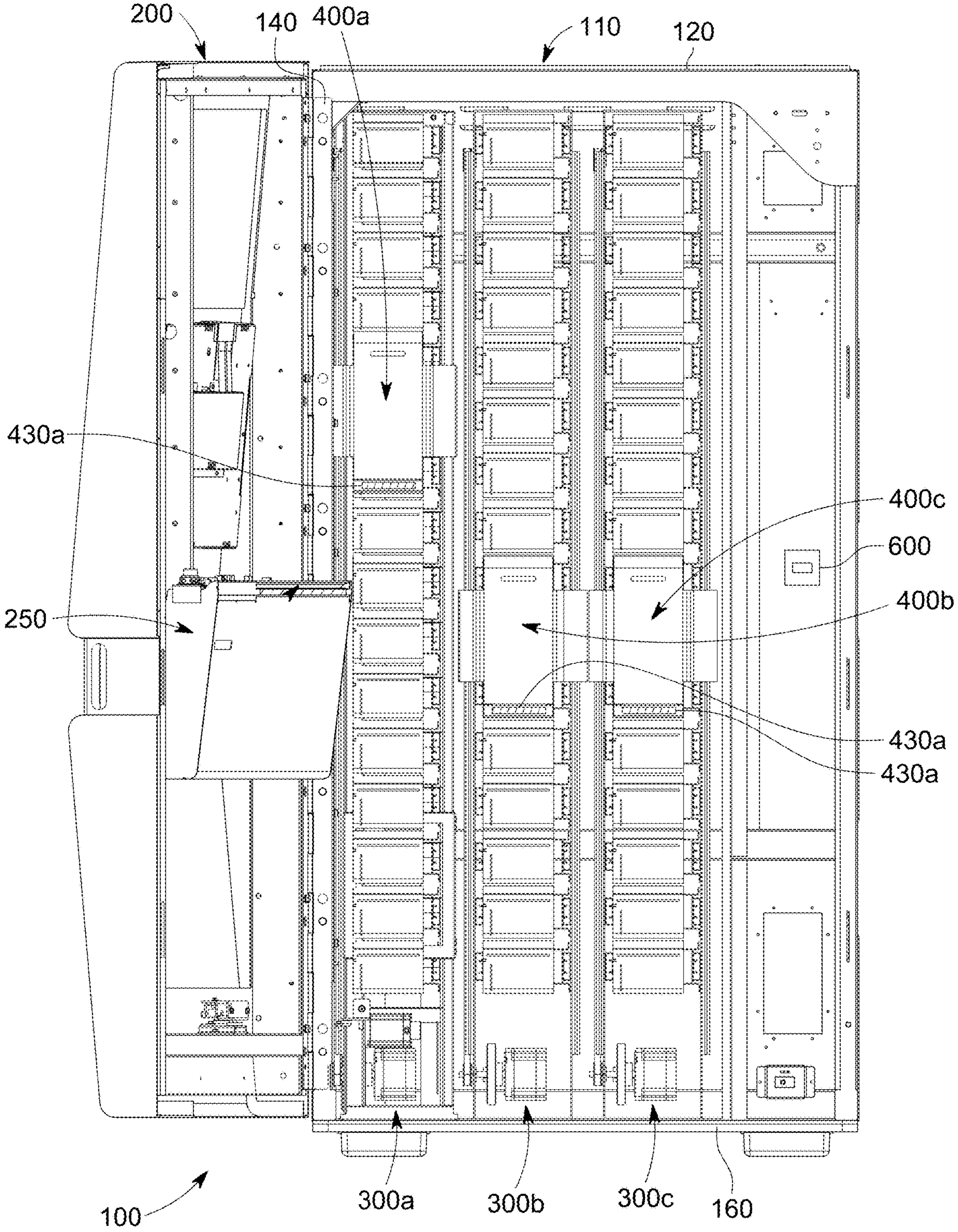
FIG. 3 is a front perspective view of the lottery ticket vending machine of FIG. 1 shown with the front door in an open position, showing the three ticket drawer columns and the three movable ticket bursters respectively associated the three ticket drawer columns, and showing the side and rear side of the ticket collection receptacle of the front door.
Figure 4:
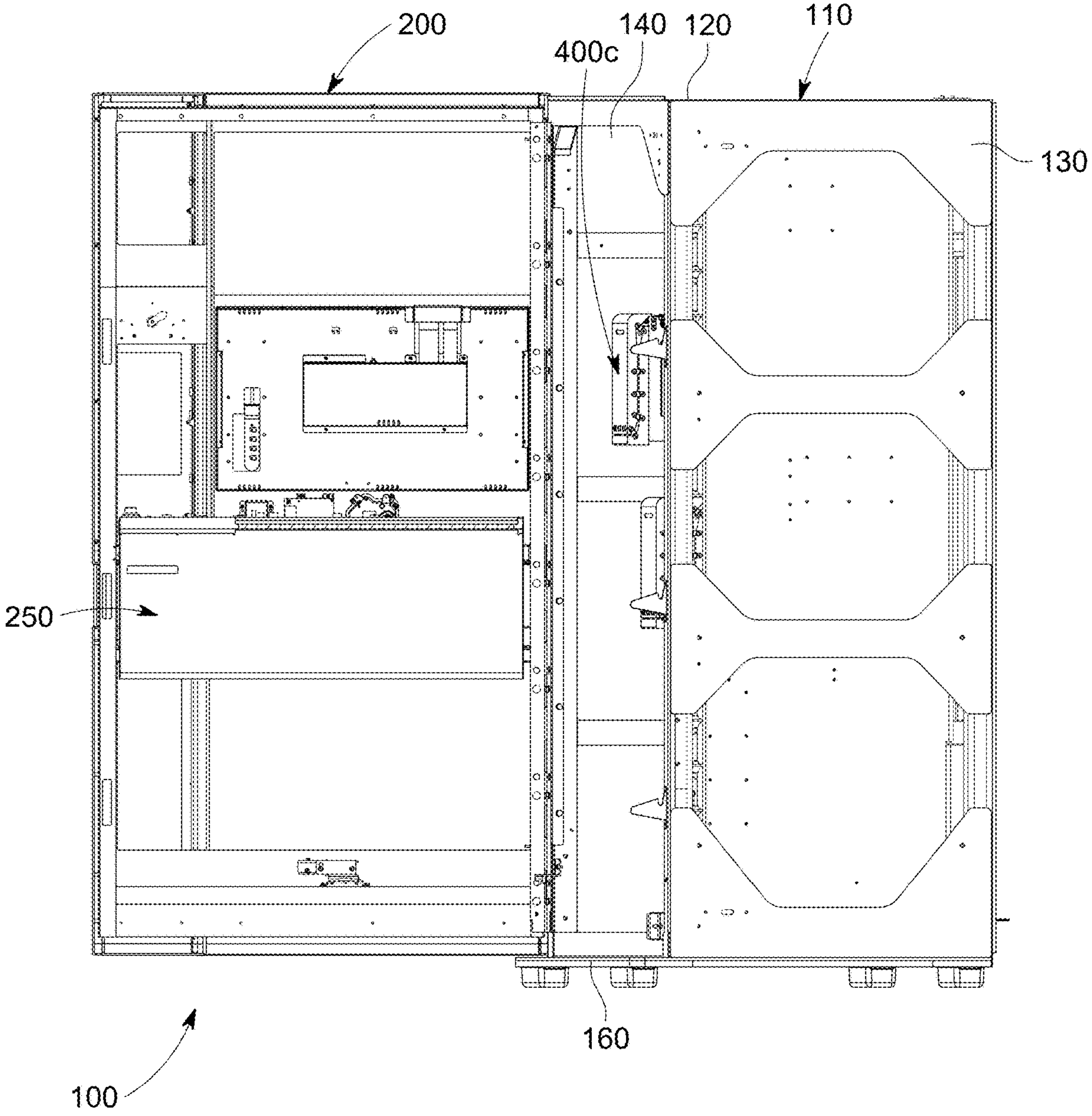
FIG. 4 is a left side view of the lottery ticket vending machine of FIG. 1 shown with the front door in an open position, shown with the left side wall outer panel removed, showing one of the movable ticket bursters, and showing the rear side of the ticket collection receptacle of the front door.
Figure 5:
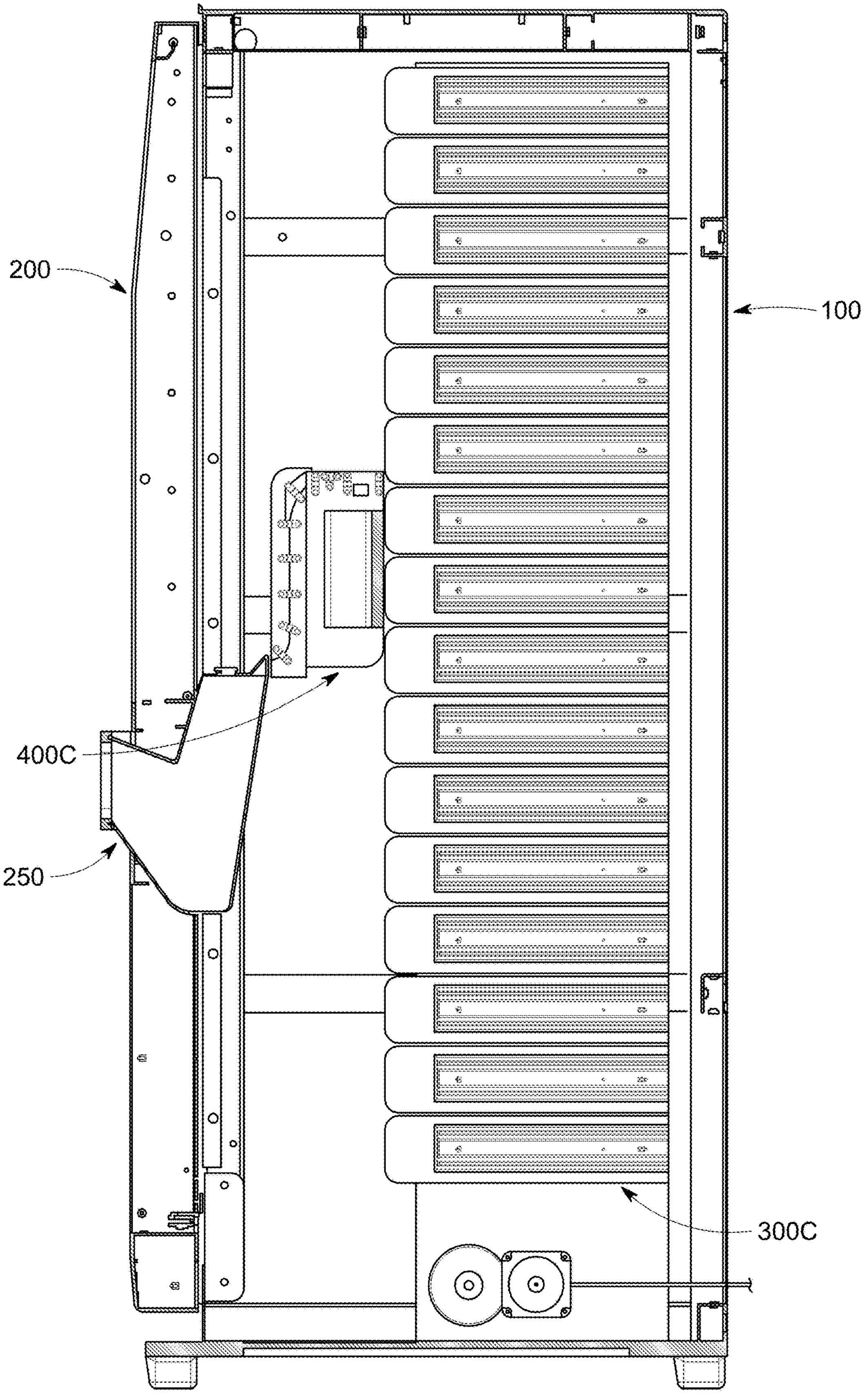
FIG. 5 is a fragmentary left side view of the lottery ticket vending machine of FIG. 1 shown with the front door in the closed position, shown with the left side wall outer panel removed, showing one of the movable ticket bursters, and showing the ticket collection receptacle of the front door.

In this illustrated example embodiment, the machine housing 110 includes a top wall 120, spaced-apart left and right side walls 130 and 140, a rear wall 150, a base 160, and the openable front door 200 pivotally connected to the right side wall 140. The base 160 is configured to rest on a floor or other suitable support. The machine housing 110 includes suitable vertically extending supports (not labeled) configured to respectively hold and support the respective ticket drawer columns 300*a*, 300*b*, and 300*c*. The ticket drawer columns can be supported in any suitable manners. The front door 200 is moveable from a closed and locked position covering the open front face of the machine housing 110 (as shown in FIGS. 1 and 5) to an open position allowing access to the interior of the machine housing 110 (such as shown in FIGS. 2, 3, and 4). The front door 200 is mounted by hinges (not shown or labeled) to the right side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The machine housing can be alternatively configured in accordance with the present disclosure.

The ticket collection receptacle 250 of the front door 200 is configured to receive lottery tickets from each of the movable ticket bursters 400*a*, 400*b*, and 400*c* and from a printer 600 as further described herein. The ticket collection receptacle 250 is configured to receive and then hold each lottery ticket received from the respective movable ticket burster or the printer to enable the respective purchaser to retrieve the dispensed lottery ticket from the ticket collection receptacle 250. The ticket collection receptacle 250 is configured such that it can receive and hold differently sized, differently shaped, and differently curled lottery tickets without damage to such lottery tickets and specifically without damage to the SOC coatings of such lottery tickets.

Figure 12:
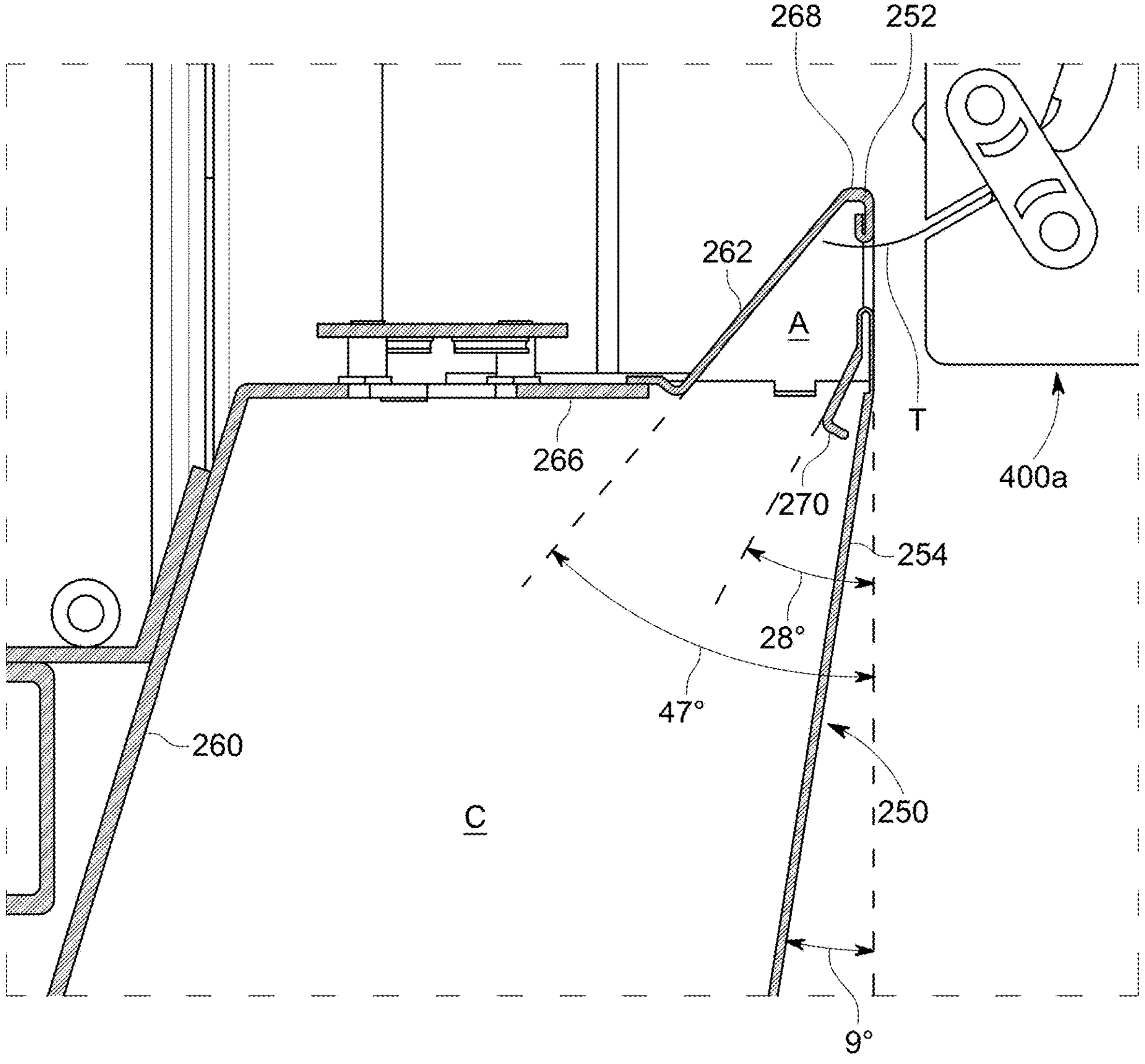
FIG. 12 is an enlarged fragmentary perspective partial cross-sectional view of part of the lottery ticket vending machine of FIG. 1 showing part of the ticket collection receptacle of the front door, part of a ticket burster, and a lottery ticket partly in the ticket burster and partly in the ticket collection receptacle.
Figure 13:
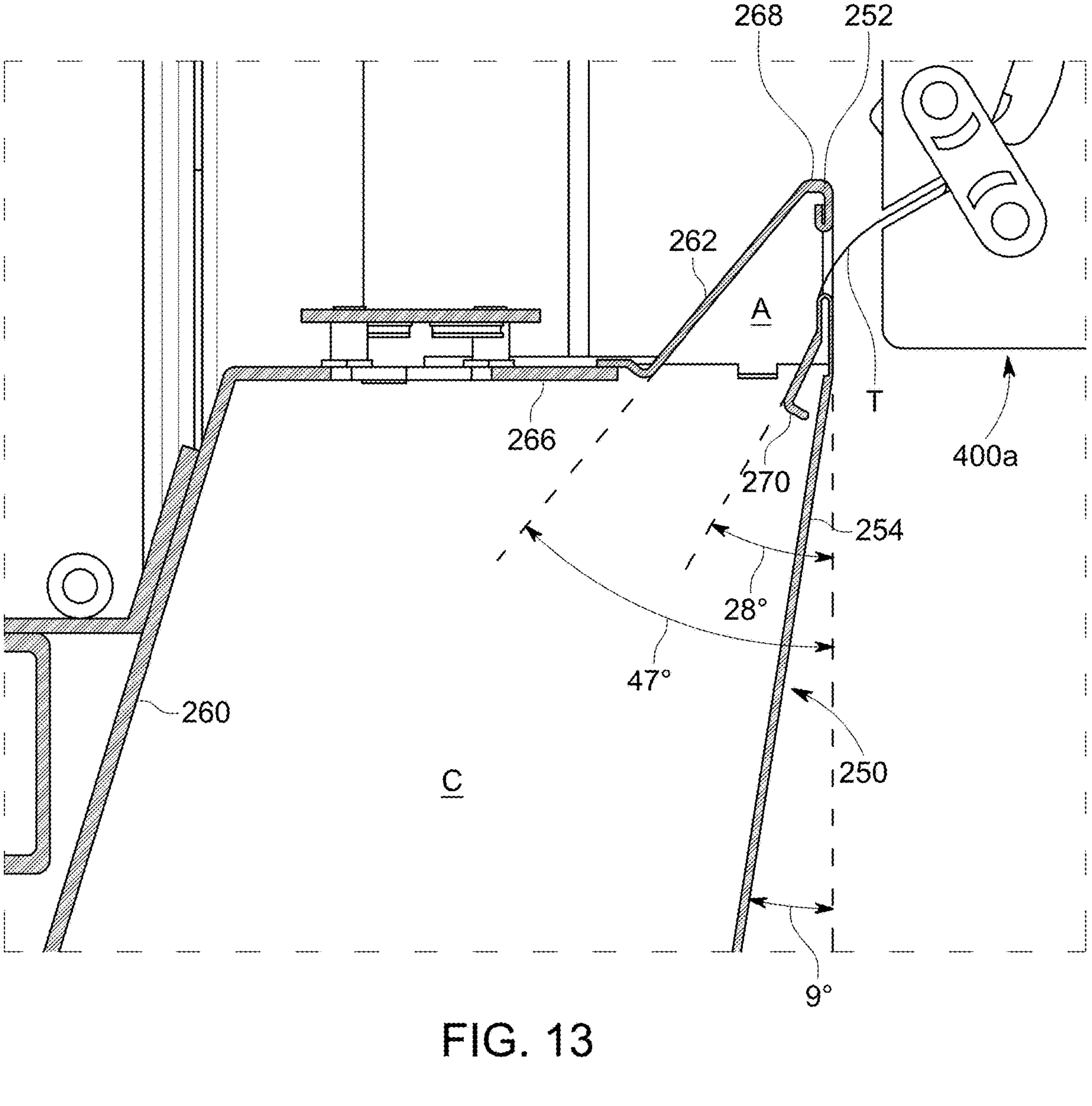
FIG. 13 is an enlarged fragmentary perspective partial cross-sectional view of part of the lottery ticket vending machine of FIG. 1 showing part of the ticket collection receptacle of the front door, part of a ticket burster, and a lottery ticket partly in the ticket burster and partly in the ticket collection receptacle.
Figure 14:
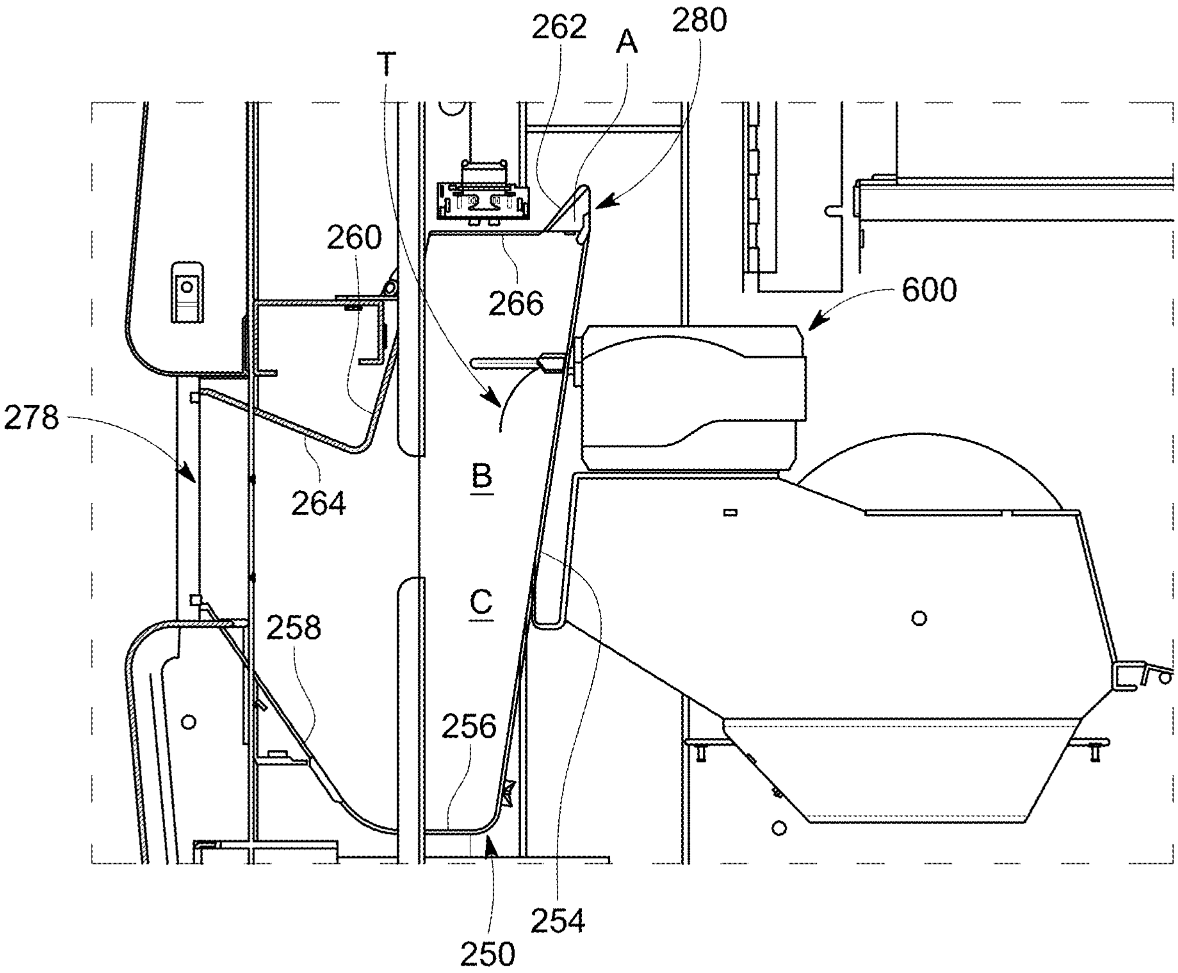
FIG. 14 is an enlarged fragmentary perspective partial cross-sectional view of part of the lottery ticket vending machine of FIG. 1 showing part of the ticket collection receptacle of the front door, a printer, and a printed lottery ticket being dispensed from the printer into the ticket collection receptacle.

In this illustrated example embodiment, the ticket collection receptacle 250 includes a first ticket-receipt section A, a second ticket-receipt section B, and a third ticket-holding-and-access section C as further described below. The first ticket-receipt section A is configured to receive instant lottery tickets from the bursters 300*a*, 300*b*, and 300*c* as best shown in FIGS. 5, 8, 9, 10, 11, 12, and 13. The second ticket-receipt section B is configured to receive printed lottery tickets (and/or receipts) from the printer 600 as best shown in FIG. 14. The third ticket-holding-and-access section C is configured to hold the received lottery tickets (and receipts) in a manner that does not block receipt of further tickets (and receipts) such as shown in FIG. 11, and to enable a purchaser to access and retrieve the lottery tickets (and receipts) held therein. The third ticket-holding-and-access section C includes a first zone C1 configured to hold instant lottery tickets and a second zone C2 configured to hold printed draw lottery tickets and receipts. The first ticket-receipt section A defines a first ticket receiving slot 280. The second ticket-receipt section B defines second ticket receiving slot 284. The third ticket-holding-and-access section C defines a ticket retrieval slot 278. These sections are formed and defined by the various walls as further described below.

More specifically, as best shown in FIGS. 6, 7, 8, 9, 10, 11, 12, 13, and 14, in this illustrated example embodiment, the ticket collection receptacle 250 includes: (1) a first rear wall 252; (2) a second rear wall 254; (3) a bottom wall 256; (4) a first front wall 258; (5) a second front wall 260; (6) a third front wall 262; (7) a first top wall 264; (8) a second top wall 266; (9) a third top wall 268; (10) an inner ramp 270; (11) a first side wall 274; and (12) a second side wall 276. These walls form and define the first ticket-receipt section A, the second ticket-receipt section B, and the third ticket-holding-and-access section C. The inner surfaces of certain of these walls direct the lottery tickets received via the first ticket-receipt section A into the third ticket-holding-and-access section C without causing damage to such lottery tickets even if such lottery tickets are curled and regardless of the size of such lottery tickets.

In this example embodiment, at least certain of the walls of the ticket collection receptacle 250 are formed from sheet metal with the grain extending from top to bottom (instead of from side to side). This provides smoother surfaces for the tickets dispensed into the ticket collection receptacle 250 to engage and move inside of the ticket collection receptacle 250. These smooth surfaces prevent damage to the SOC's of the lottery tickets as such lottery tickets move into the ticket collection receptacle 250.

In this example embodiment, the second rear wall 254, the bottom wall 256, the first front wall 258, the second front wall 260, the first top wall 264, the second top wall 266, the third top wall 268, and the inner ramp 270 are formed from sheet metal with the grain of walls extending from top to bottom (instead of from side to side). In one example embodiment, the first rear wall 252, the third front wall 262, and the third top wall 268 are also formed from sheet metal with the grain of walls extending from top to bottom (instead of from side to side). In one example embodiment, the first side wall 274 and the second side wall 276 are also formed from sheet metal with the grain of walls extending from top to bottom (instead of from side to side).

Figure 7:
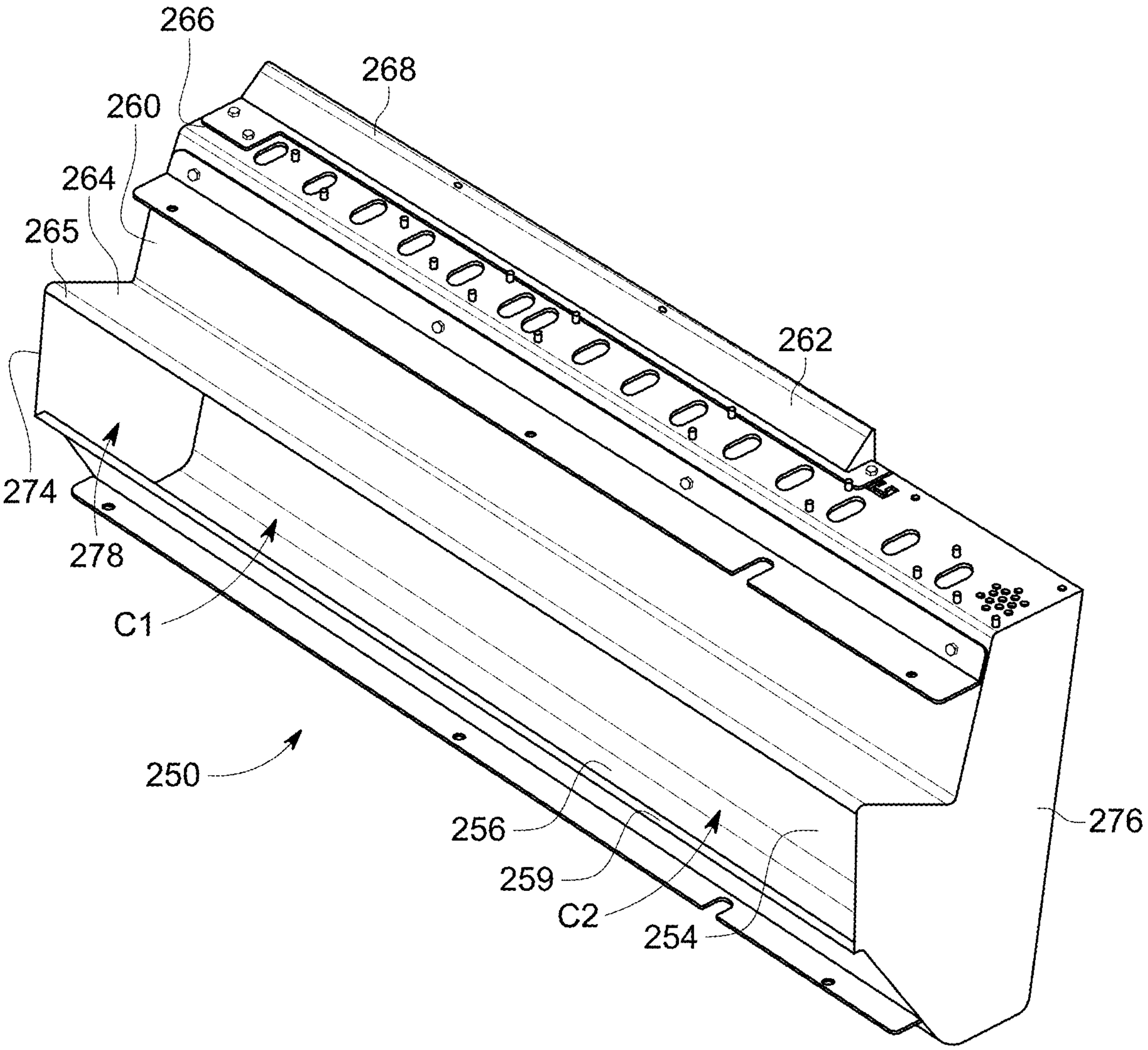
FIG. 7 is an enlarged front perspective view of the ticket collection receptacle shown removed from the front door of the lottery ticket vending machine of FIG. 1.
Figure 8:
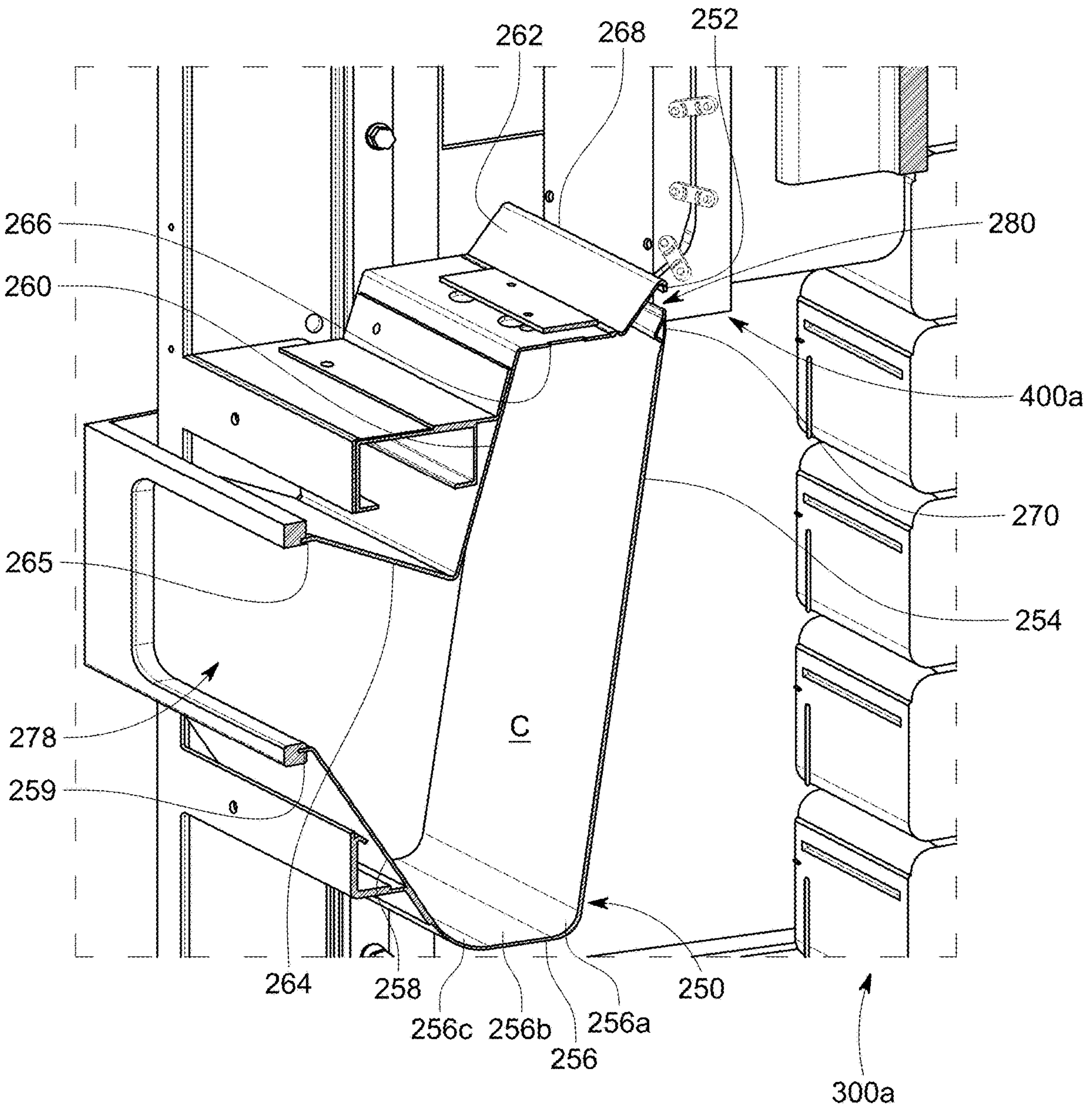
FIG. 8 is an enlarged fragmentary perspective partial cross-sectional view of part of the front door of the lottery ticket vending machine of FIG. 1 and showing part of the ticket collection receptacle of the front door.

In this illustrated example embodiment, as best seen in FIG. 7, the first rear wall 252, the third front wall 262, and the third top wall 268 are formed from a separate pieces of sheet metal and suitably attached the top wall 266.

In various embodiments, the walls of the ticket collection receptacle can be formed from multiple separate wall that are suitably attached.

In this illustrated example embodiment, the walls of the ticket collection receptacle 250 are formed at suitable angles to direct the lottery tickets dispensed into the ticket collection receptacle 250 to engage and move inside of the ticket collection receptacle 250. These angles are shown in FIGS. 11, 12, and 13 with respect to the vertical dotted line that functions as a reference line. It should be appreciated that these angles are approximate angles and that these angles can vary in accordance with the present disclosure. In various embodiments, these angles can vary +/−ten degrees.

Figure 9:
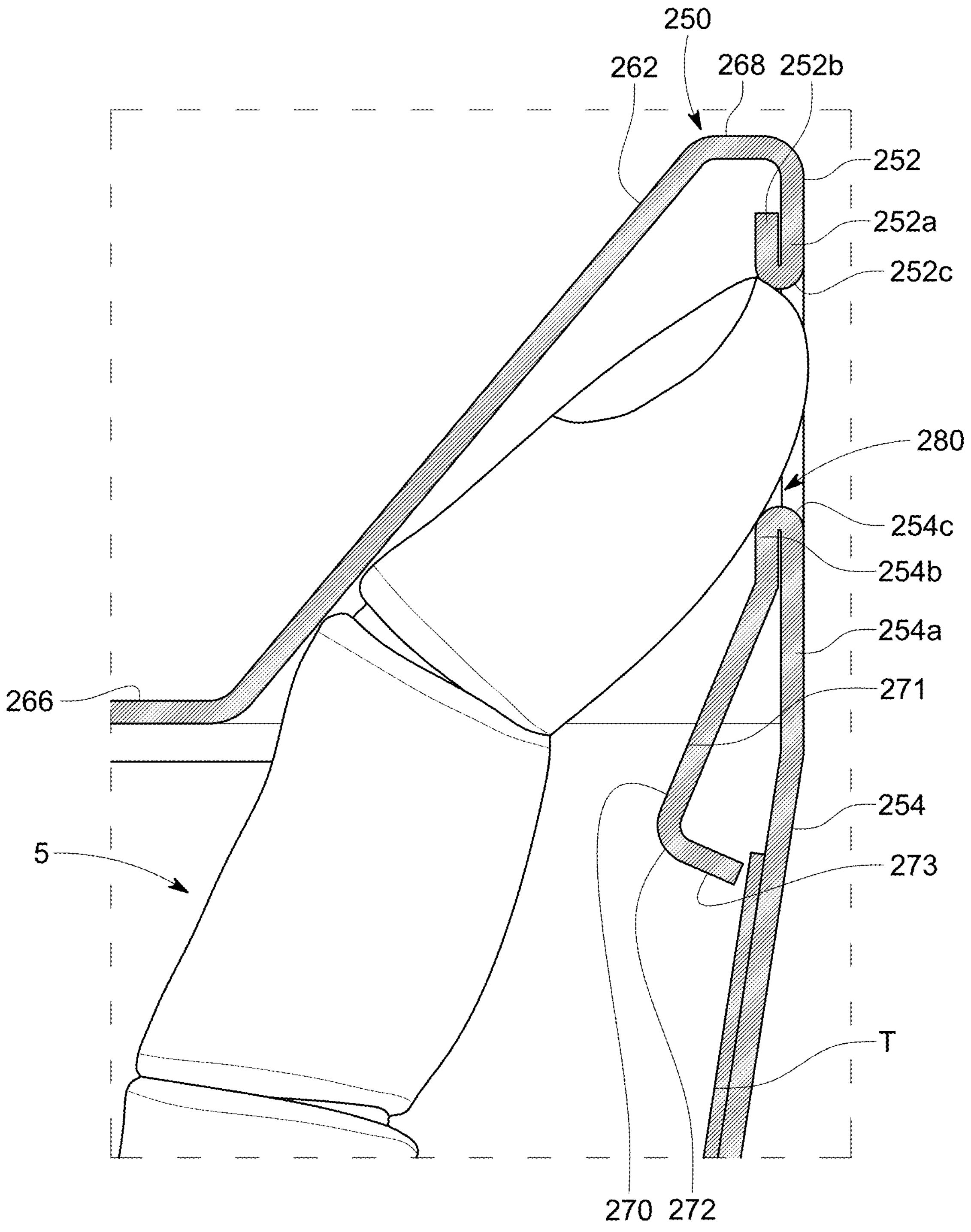
FIG. 9 is an enlarged fragmentary perspective partial cross-sectional view of a rear portion of the ticket collection receptacle of the front door of the lottery ticket vending machine of FIG. 1 and showing part of person's finger in the rear portion of the ticket collection receptacle.

More specifically, as best shown in FIG. 9, the first rear wall 252 is connected to (at its top portion) and extends downwardly from the third top wall 268. The first rear wall 252 includes (at its bottom portion) an outer section 252*a*, an inner section 252*b*, and a curved smooth lower edge 252*c*. The lower edge 252*c* is spaced apart from the second rear wall 254 and partially defines an elongated horizontally extending first ticket receiving slot 280 of the ticket collection receptacle 250. The first ticket receiving slot 280 of the ticket collection receptacle 250 is configured to receive tickets from the burster 400*a*, 400*b*, and 400*c* such as shown in FIGS. 10, 11, 12, and 13. The ticket receiving slot 280 is (and needs to be) small enough so that a purchaser cannot insert the purchaser's hand or finger through the ticket receiving slot 280 and thereby cannot access any of the lottery tickets in the ticket drawers of the ticket drawer columns 300*a*, 300*b*, or 300*c* in an unauthorized manner. The curved smooth lower edge 252*c* prevents damage to each lottery ticket that enters the ticket collection receptacle 250 through the ticket receiving slot 280, and helps purchasers receive their lottery tickets with ease, and particularly preventing "sticking" between the ticket collection receptacle 250 and the lottery ticket.

The second rear wall 254 as best shown in FIGS. 8, 9, 10, 11, 12, and 13, is connected (at its bottom portion) to and extends upwardly from the bottom wall 256. The second rear wall 254 is thus below and spaced-apart from the first rear wall 252. The second rear wall 254 includes (at its top portion) an outer section 254*a*, an inner section 254*b*, and a curved smooth upper edge 254*c*. The upper edge 254*c* is spaced apart from the first rear wall 252 and partially defines the elongated horizontally extending first ticket receiving slot 280 of the ticket collection receptacle 250. The curved smooth upper edge 254*c* prevents damage to each lottery ticket that enters the ticket collection receptacle 250 through the ticket receiving slot 280.

As best seen in FIG. 9, the first rear wall 252 and the second rear wall 254 that define the ticket receiving slot 280 are close enough to prevent a person from inserting a finger (such as finger 5) through the ticket receiving slot 280 to access the bursters, the ticket drawers, or the ticket columns of the vending machine 100 through the ticket collection receptacle 250, or make it very difficult to do so.

Figure 6:
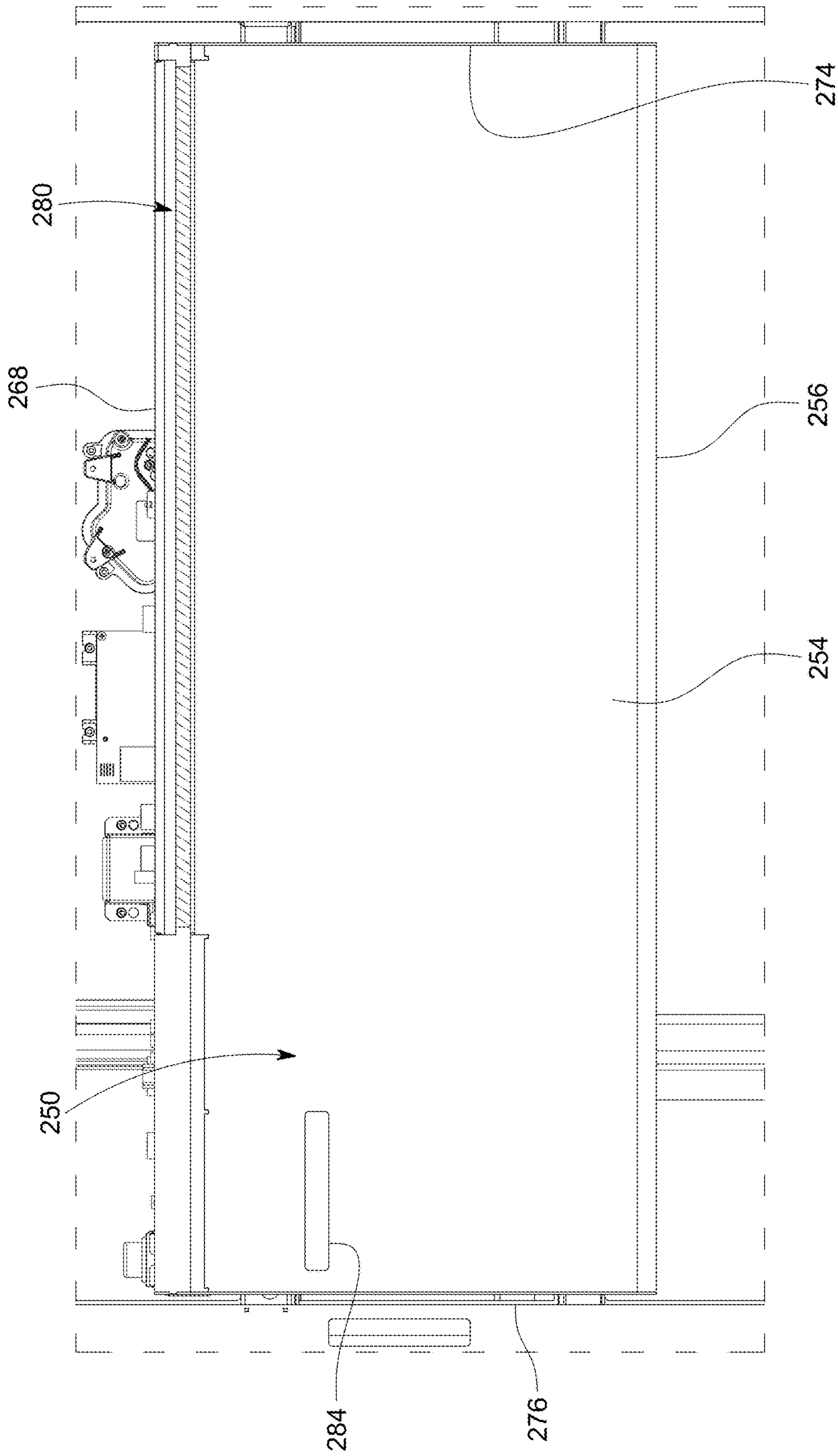
FIG. 6 is an enlarged fragmentary rear view of the front door of the lottery ticket vending machine of FIG. 1 showing the rear side of the ticket collection receptacle of the front door.

The second rear wall 254 also defines a horizontally extending second ticket receiving slot 284 of the ticket collection receptacle 250 that is best shown in FIG. 6. The second ticket receiving slot 284 of the ticket collection receptacle 250 is configured to receive printed tickets and/or printed receipts from the printer 600 as best shown in FIG. 14.

As best shown or indicated in FIGS. 6 and 7, the second rear wall 254 extends the entire side-to-side length of the ticket collection receptacle 250 and the first rear wall 252 extends for only a portion of the entire side-to-side length of the ticket collection receptacle 250. Likewise, the ticket receiving slot 280 extends for only a portion of the entire side-to-side length of the ticket collection receptacle 250. Thus, tickets from the bursters are dispensed and received in the portion of the ticket collection receptacle 250 under the first ticket receiving slot 280 and tickets (and receipts) from the printer 600 are dispensed and received in the portion of the ticket collection receptacle 250 under the second ticket receiving slot 284.

The inner ramp 270 as best shown in FIGS. 8, 9, 10, 11, 12, and 13, is connected to (at its top portion) and extends downwardly from the inner section 254*b* of the second rear wall 254. The inner ramp 270 includes (at its top portion) an upper section 271 that is angled away from the second rear wall 254. The inner ramp 270 includes (at its bottom portion) a lower section 273 that is angled toward and extends toward the second rear wall 254. The upper section 271 and the lower section 273 are connected by a curved smooth intermediate section 272. The curved smooth intermediate section 272 prevents damage to each lottery ticket that enters the ticket collection receptacle 250 through the ticket receiving slot 280 and that extends along the ramp 271.

In this illustrated example embodiment, the end of the lower section 273 is spaced from the second rear wall 254 as best shown in FIG. 9 to enable one or more tickets (such as ticket T) that have been previously received in the ticket collection receptacle 250 to rest on the bottom wall 256 and against the rear wall 254 in positions that such tickets are out of the way of any additional tickets that are dispensed in the ticket collection receptacle 250. In other words, the bottom wall 256, the rear wall 254, and the ramp 270 define a ticket accumulation area that is out of the way of addition tickets being dispensed into the ticket collection receptacle 250. The ticket accumulation area is part of the third ticket-holding-and-access section C.

The bottom wall 256 as best shown in FIGS. 8, 10, 11, and 14, is connected (at its inner portion) to and extends outwardly from the second rear wall 254. The bottom wall 256 is connected (at its outer portion) to and extends inwardly from the first front wall 258. The bottom wall 256 includes a curved inner section 256*a*, a curved outer section 256*c*, and a straight intermediate section 256*b*. The bottom wall 256 extends the entire side-to-side length of the ticket collection receptacle 250. The bottom wall 256 is configured to support tickets (and receipts) dispensed into the ticket collection receptacle 250.

The first front wall 258 as best shown in FIGS. 7, 8, 10, 11, and 14, is connected (at its lower portion) to and extends upwardly and outwardly from the bottom wall 256. The first front wall 258 extends the entire side-to-side length of the ticket collection receptacle 250. The first front wall 258 includes a lip 259 (at its upper portion) that extends toward, engages, and extends into a portion (not labeled) of the front door 200. The lip 259 is spaced apart from the first top wall 264 and partially defines an elongated horizontally extending ticket retrieval slot 278. The elongated horizontally extending ticket retrieval slot 278 is (and needs to be) large enough so that a purchaser can insert the purchaser's hand through the ticket retrieval slot 278 to retrieve lottery tickets (and receipts) that are dispensed into the ticket collection receptacle 250.

The first top wall 264 as best shown in FIGS. 7, 8, 10, 11, and 14, is connected (at its inner portion) to and extends upwardly and outwardly from the second front wall 260. The first top wall 264 extends the entire side-to-side length of the ticket collection receptacle 250. The first top wall 264 includes a lip 265 (at its upper portion) that extends toward, engages, and extends into a portion (not labeled) of the front door 200. The lip 265 is spaced-apart from the first front wall 258 and partially defines the elongated horizontally extending ticket retrieval slot 278.

The second front wall 260 as best shown in FIGS. 7, 8, 10, 11, 12, 13, and 14, is connected (at its outer portion) to and extends upwardly and inwardly from the first top wall 264, and is connected (at its inner portion) to and extends downwardly and outwardly from the second top wall 266. The second front wall 260 extends the entire side-to-side length of the ticket collection receptacle 250.

The second top wall 266 as best shown in FIGS. 7, 8, 10, 11, 12, 13, and 14, is connected (at its outer portion) to and extends upwardly and inwardly from the second front wall 260, and is connected (at its inner portion) to and extends outwardly from the third front wall 262. The second top wall 266 extends the entire side-to-side length of the ticket collection receptacle 250.

The third front wall 262 as best shown in FIGS. 7, 8, 9, 10, 11, 12, and 13, is connected (at its outer portion) to and extends upwardly and inwardly from the second top wall 266, and is connected (at its inner portion) to and extends downwardly and outwardly from the third top wall 268. The third front wall 262 extends for only a portion of the entire side-to-side length of the ticket collection receptacle 250.

The third top wall 268 as best shown in FIGS. 7, 8, 9, 10, 11, 12, and 13, is connected (at its outer portion) to and extends inwardly from the third front wall 262, and is connected (at its inner portion) to and extends outwardly from the first rear wall 252. The third top wall 268 extends for only a portion of the entire side-to-side length of the ticket collection receptacle 250.

The first side wall 274 is connected to the first rear wall 252, the second rear wall 254, the bottom wall 256, the first front wall 258, the second front wall 260, the third front wall 262, the first top wall 264, the second top wall 266, and the third top wall 268. The side wall 274 partially defines the horizontally extending second ticket receiving slot 284. The side wall 274 also partially defines the ticket receiving slot 280. An additional inner wall (not labeled) also defines the ticket receiving slot 280 as best shown in FIG. 7.

The second side wall 276 is connected to the second rear wall 254, the bottom wall 256, the first front wall 258, the second front wall 260, the third front wall 262 the first top wall 264, and the second top wall 266. The side wall 276 also partially defines the ticket retrieval slot 278.

In this illustrated example embodiment, the ticket burster 400*a*, 400*b*, and 400*c* are each configured to deliver the respective lottery tickets to the ticket collection receptacle 250 at a 30 degree angle or approximately a 30 degree angle. In various embodiments, this angle varies +/−10 degrees in accordance with the present disclosure. The leading edge of each such lottery ticket will travel across a small gap between such ticket burster and the ticket receiving slot 280 and then move through the ticket receiving slot 280 into the ticket collection receptacle 250.

Figure 10:
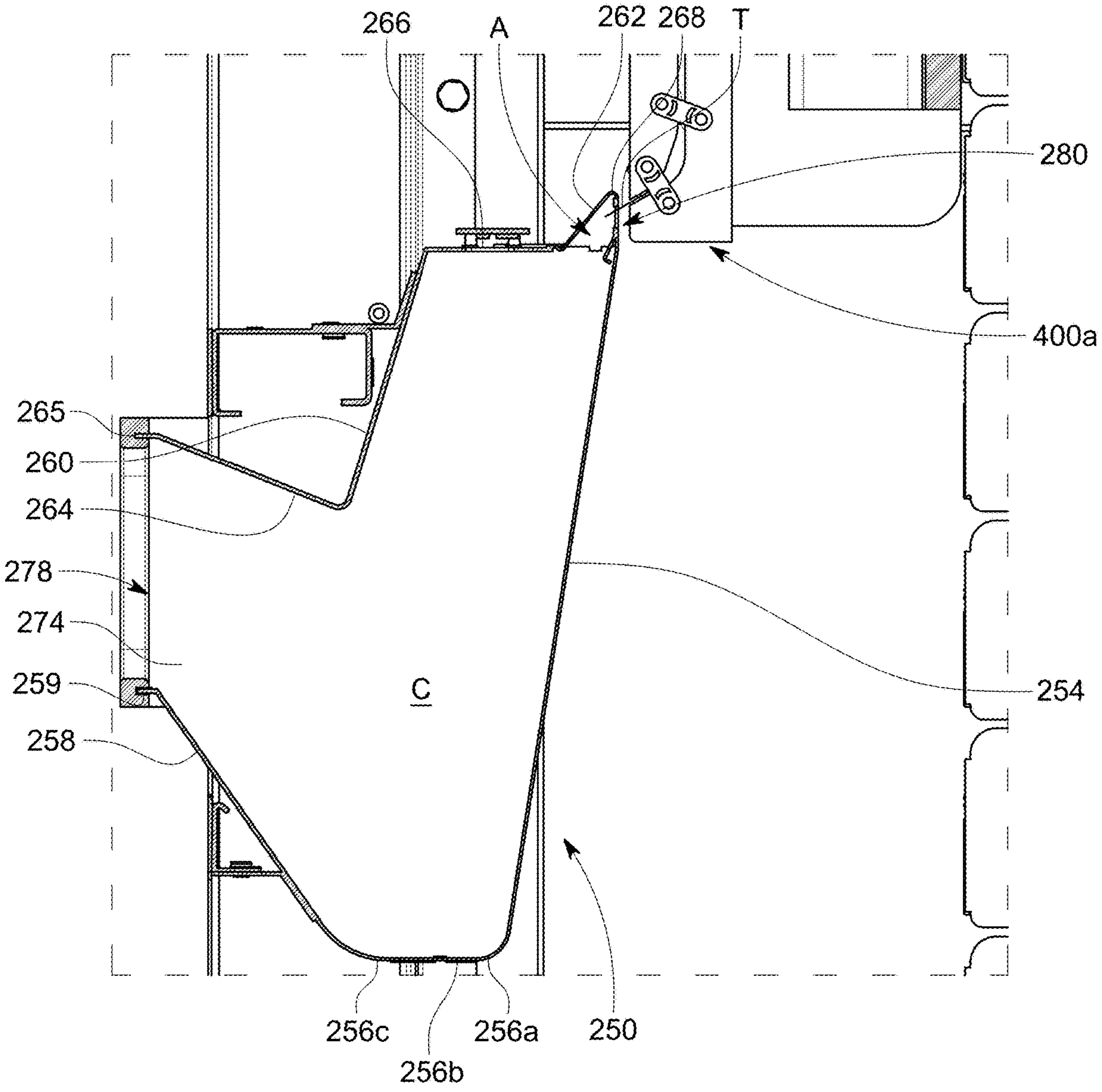
FIG. 10 is an enlarged fragmentary perspective partial cross-sectional view of part of the lottery ticket vending machine of FIG. 1 showing part of the ticket collection receptacle of the front door, part of a ticket burster, and a lottery ticket partly in the ticket burster and partly in the ticket collection receptacle.
Figure 11:
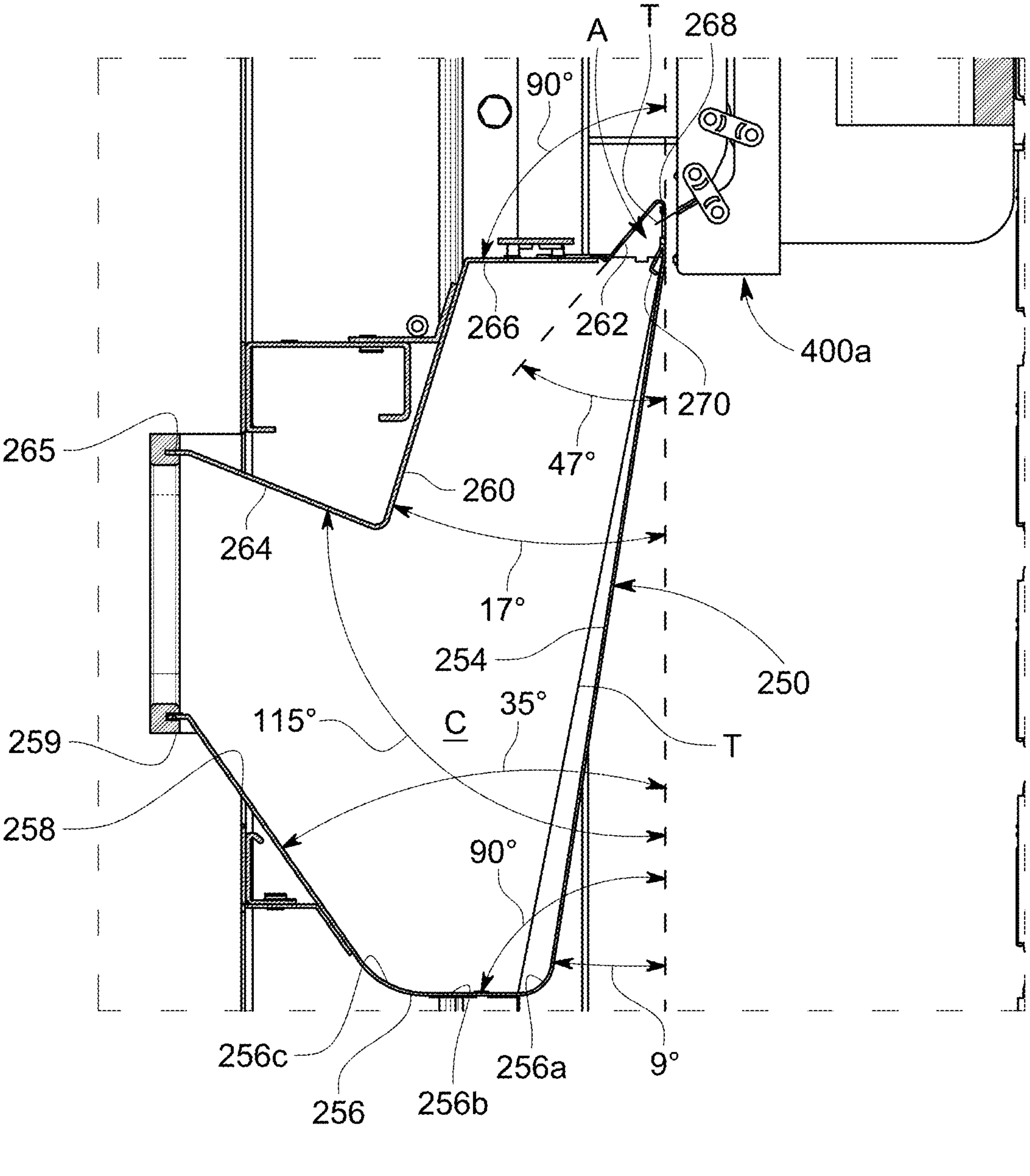
FIG. 11 is an enlarged fragmentary perspective partial cross-sectional view of part of the lottery ticket vending machine of FIG. 1 showing part of the ticket collection receptacle of the front door, part of a ticket burster, a lottery ticket partly in the ticket burster and partly in the ticket collection receptacle, and another lottery ticket in the ticket collection receptacle.

As best shown in FIGS. 10 and 11, when a lottery ticket T that is straight is dispensed by a ticket burster (such as ticket burster 400*a*) through the ticket receiving slot 280, the lottery ticket will contact the inner surface of the third front wall 262 and be directed downwardly. The walls of the ticket collection receptacle 250 (including walls 252, 254, 262, 266, and 268) as well as the ramp 271 are configured to allow the straight ticket T to move into the first ticket-receipt section A and then into the ticket-holding-and-access section C.

As best shown in FIG. 12, when a ticket T that is upwardly curled is dispensed by a ticked burster (such as the ticket burster 400*a*) through the ticket receiving slot 280, the lottery ticket will contact the inner surface of the third front wall 262 and be deflected downwardly. The walls of the ticket collection receptacle 250 (including walls 252, 254, 262, 266, and 268) as well as the ramp 271 are configured to allow the upwardly curled ticket T to move into the first ticket-receipt section A and be directed downwardly into the ticket-holding-and-access section C. In other words, the upwardly curled ticket T can engage the inner surface of the angled wall 262 and be directed by that wall 266 downwardly into the ticket-holding-and-access section C.

As best shown in FIG. 13, when a ticket T that is downwardly curled is dispensed by a ticked burster (such as the ticket burster 400*a*) through the ticket receiving slot 280, the lottery ticket will contact the inner surface of ramp 271 and be directed downwardly. The walls of the ticket collection receptacle 250 (including walls 252, 254, 262, 266, and 268) as well as the ramp 271 are configured to allow the downwardly curled ticket T to move into the first ticket-receipt section A and then into the ticket-holding-and-access section C. In other words, the downwardly curled ticket T can engage the inner surface of the ramp 271 and be directed by that ramp 271 downwardly into the ticket-holding-and-access section C.

Thus, the walls of the ticket collection receptacle 250 are configured to direct lottery tickets of different sizes and shapes into the ticket collection receptacle 250, and are configured to hold the received lottery tickets of different sizes and shapes therein while allowing other lottery tickets to enter the ticket collection receptacle 250.

In various other embodiments, the walls of the ticket collection receptacle 250 are formed from another suitable material such as but not limited to a plastic material.

It should be appreciated that in various embodiments, the walls of the ticket collection receptacle 250 are formed to provide static electricity dissipation (that can be created with the dispensing of paper based products such as lottery tickets.

Although not shown, the vending machine 100 can include one or a series of indicators such as lights and more specifically such as LED lights that indicate to the customer the status of the delivery of the lottery tickets to the ticket collection receptacle 250.

Each of the ticket drawer columns 300*a*, 300*b*, and 300*c* are identical in this example embodiment. For brevity, only ticket drawer column 300*a* is described herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets such as instant lottery tickets for dispensing by the ticket vending machine 100. The ticket drawers can vary in quantity, size, and shape depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated that two or more ticket drawers can hold the same type of lottery tickets. In various embodiments, each of the ticket drawers is configured to feed each instant lottery ticket held by that ticket drawer into the associated ticket burster 400*a* when the ticket burster 400*a* is moved into alignment with such ticket drawer for receipt, bursting, and dispensing of that lottery ticket. Bursting of the lottery ticket is the industry term for separating a lottery ticket from a pack of lottery tickets held in a ticket drawer. In this illustrated embodiment, the ticket drawers do not burst the lottery tickets and do not include any mechanisms for busting the lottery tickets. Rather, in this illustrated embodiment, the moveable ticket burster 400*a* is configured to receive and burst the lottery tickets fed by the lottery ticket drawers of the ticket drawer column 300*a* into the ticket burster 400*a*.

The movable ticket burster 400*a* is supported by one or more burster supporters (such as burster supporter 480*a*). The burster supporter(s) can be any suitable structure(s) that supports the ticket burster 400*a* in a manner that enables the ticket burster 400*a* to vertically move to any of a plurality of different ticket receipt positions that are associated with and in alignment with the respective ticket drawers of the ticket drawer column 300*a*. The burster supporter(s) also support the ticket burster 400*a* in a manner that enables the ticket burster 400*a* to vertically move to into alignment with the ticket collection receptacle 250 as further discussed herein.

The ticket vending machine 100 includes one or more actuators (not shown) that control movement of the ticket burster 400*a* under control of the controller of the ticket vending machine 100 and/or the controller (described below) of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporter 480*a* to different vertical locations including a plurality of the locations respectively associated and aligned with each of the ticket drawers of the ticket drawer column 300*a* such that the ticket burster 400*a* is positioned to receive one or more of the instant lottery tickets stored in each respective ticket drawers for obtaining and dispensing that instant lottery ticket into the ticket receptacle 250 for the purchaser as requested by the purchaser.

Figure 15:
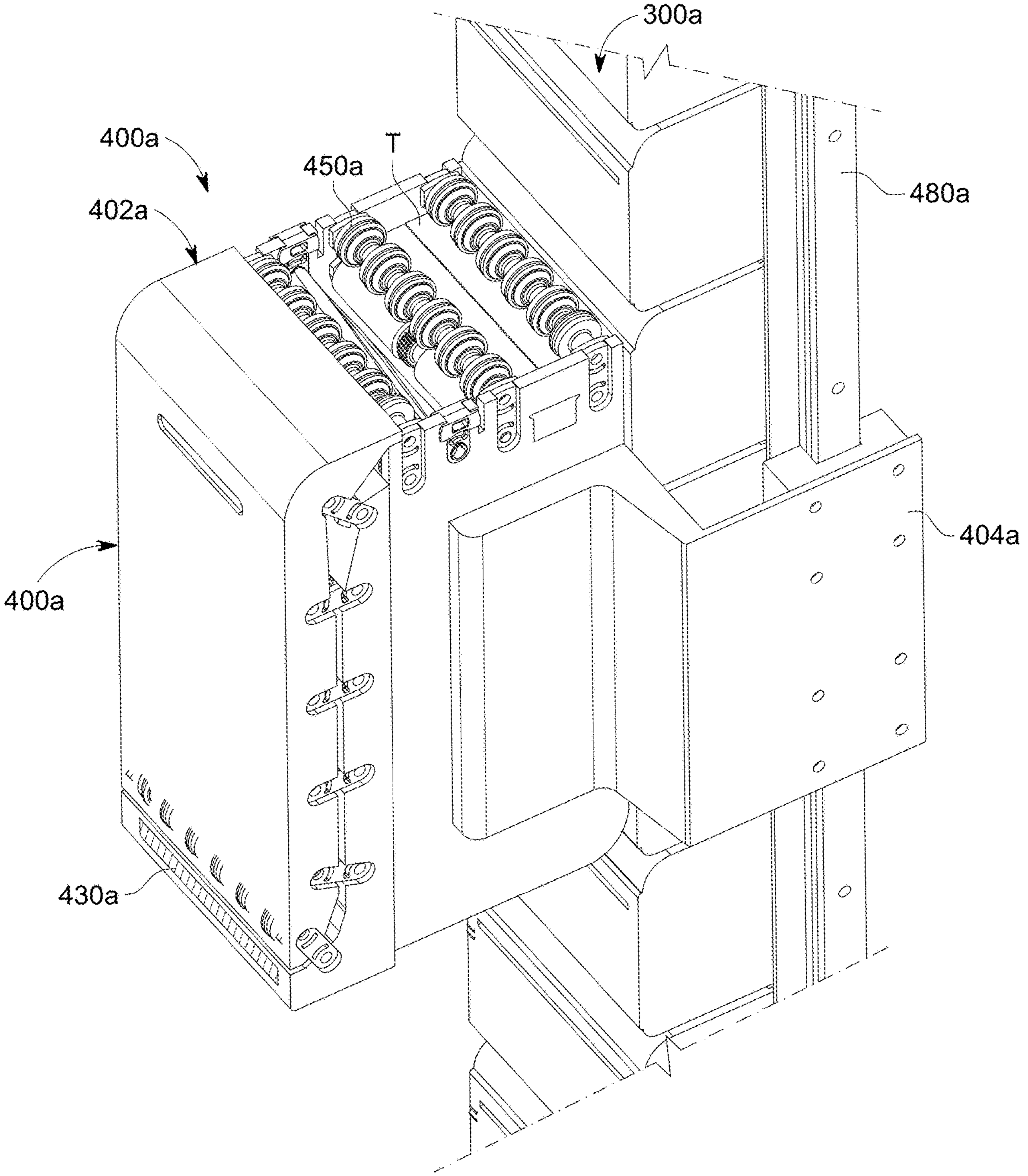
FIG. 15 is an enlarged fragmentary perspective view of a first one of the ticket drawer columns and a first one of the ticket bursters that is associated with that ticket drawer column of the lottery ticket vending machine of FIG. 1.

As best shown in FIG. 15, the example movable ticket burster 400*a* generally includes: (a) a burster housing 402*a*; (b) one or more burster supporter connecters (such as burster support connector 404*a* connecting the burster housing 402*a* to the burster supporter 480*a*); (c) one or more sensors (not labeled) supported by the burster housing 402*a*; (d) a ticket cutter (not labeled) in and supported by the burster housing 402*a*; (e) a plurality of ticket engagers 450*a* supported by the burster housing 402*a*; and (f) a burster controller (not shown). The ticket burster 400*a* is generally configured to burst the perforations between an instant lottery ticket moved from a ticket drawer into the ticket burster 400*a* and the next instant lottery ticket of the pack in the ticket drawer to enable the instant lottery ticket to be dispensed into the ticket receptacle 250. This prevents a person from improperly tearing an instant lottery ticket or being able to pull an extended quantity of instant lottery tickets from one of the ticket packs in one of the ticket drawers.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster. The burster controller can be hard wired or wirelessly connected to and in communication with the cutter, the actuators for the driven rollers, and any actuators on or associated with the ticket burster that cause the movement of the ticket burster. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be wirelessly connected to and in communication with the cutter, the actuators for the driven rollers, and any actuators on the ticket burster or the burster supporter that cause the movement of the ticket burster. In various embodiments, the burster controller is not supported by the burster housing 402*a* and is thus separate from the burster housing.

The burster defines a ticket inlet (not labeled) through which the ticket burster 400*a* is configured to receive a lottery ticket (such as lottery ticket T) from a ticket drawer of the ticket drawer column 300*a*, a ticket outlet (not labeled) through which the ticket burster 400*a* is configured to move the received instant lottery ticket into the ticket collection receptacle 250, and a ticket movement path (not labeled) extending from the ticket inlet to the ticket outlet and through which the lottery ticket is moved through the ticket burster 400*a*.

In alternative embodiments, one or more of the ticket bursters can be configured such that the burster housing is rotatable about a horizontal axis to separate (via a tearing and/or twisting motion) each instant lottery ticket along the perforations connecting that instant lottery ticket to the next instant lottery ticket in the pack. In such embodiments, the positions of the ticket bursters may additionally vary and make the repeated precise alignment with the ticket collection receptacle 250 more difficult to consistently achieve.

In various alternative embodiments, the ticket vending machine of the present disclosure can have more than one ticket burster for one or more of the ticket drawer columns such that they can operate at the same time, or such that one or more ticket bursters are back-ups in case there is an issue with one of the other ticket bursters.

It should be appreciated from the above that the present disclosure provide a lottery ticket vending machine comprising: (1) a machine housing comprising an openable front door, the front door comprising a ticket collection receptacle comprising: a first ticket-receipt section defining a first ticket receiving slot, a second ticket-receipt section defining a second ticket receiving slot, and a third ticket-holding-and-access section defining a ticket retrieval slot, wherein the second ticket-receipt section and the third ticket-holding-and-access section comprise a plurality of walls formed from a sheet metal with a grain extending in an upright direction; (2) a ticket drawer column in the machine housing, the ticket drawer column comprising a plurality of ticket drawers, each of the ticket drawers configured to hold a pack of lottery tickets; and (3) a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle. In various such embodiments, the first ticket-receipt section comprises a downwardly extending angled ramp below the first ticket receiving slot. In various such embodiments, the first ticket-receipt section comprises a downwardly angled wall spaced-apart from the ramp. In various such embodiments, the first ticket-receipt section comprises a first rear wall and a second rear wall that partially define the first ticket receiving slot. In various such embodiments, the second rear wall is directedly connected to the ramp. In various such embodiments, the ramp is connected to a top portion and extends downwardly from an inner section of the second rear wall. In various such embodiments, the ramp comprises an upper section that is angled away from the second rear wall. In various such embodiments, the ramp comprises a lower section that is angled toward and extends toward the second rear wall. In various such embodiments, the lower section of the ramp is spaced-apart from the second rear wall. In various such embodiments, the upper section of the ramp and the lower section of the ramp are connected by a curved smooth intermediate section.

It should be appreciated from the above that the present disclosure provide a lottery ticket vending machine comprising: (1) a machine housing comprising an openable front door, the front door comprising a ticket collection receptacle comprising: a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, and a third top wall connected to and extending inwardly from the third front wall, the third top wall connected to and the first rear wall, and wherein the first rear wall is connected to extends downwardly from the third top wall; (2) a ticket drawer column in the machine housing, the ticket drawer column comprising a plurality of ticket drawers, each of the ticket drawers configured to hold a pack of lottery tickets; and (3) a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle. In various such embodiments, the second rear wall, the bottom wall, the first front wall, the first top wall, the second front wall, and the second top wall are formed from a sheet metal with a grain extending in an upright direction. In various such embodiments, the first rear wall, the third top wall, and the third front wall are formed from a separate piece of sheet metal and attached to the second top wall. In various such embodiments, the lottery ticket vending machine comprises a downwardly extending angled ramp below the first ticket receiving slot. In various such embodiments, the ramp is connected at a top portion and extends downwardly from an inner section of the second rear wall. In various such embodiments, the ramp comprises an upper section that is angled away from the second rear wall. In various such embodiments, the ramp comprises a lower section that is angled toward and extends toward the second rear wall. In various such embodiments, the lower section of the ramp is spaced-apart from the second rear wall.

It should be appreciated from the above that the present disclosure provide a lottery ticket vending machine comprising: (1) a machine housing comprising an openable front door, the front door comprising a ticket collection receptacle comprising: a ticket-receipt section and a ticket-holding-and-access section that are formed by: a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, a third top wall connected to and extending inwardly from the third front wall, the third top wall connected to and the first rear wall, and wherein the first rear wall is connected to extends downwardly from the third top wall, and a downwardly extending angled ramp below the first ticket receiving slot, wherein the ramp is connected at a top portion and extends downwardly from an inner section of the second rear wall, the ramp comprises an upper section that is angled away from the second rear wall, and the ramp comprises a lower section that is angled toward and extends toward the second rear wall; (2) a ticket drawer column in the machine housing, the ticket drawer column comprising a plurality of ticket drawers, each of the ticket drawers configured to hold a pack of lottery tickets; and (3) a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle. In various such embodiments, the first rear wall, the third top wall, and the third front wall are formed separately from and attached to the second top wall.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:

a machine housing comprising an openable front door, the front door comprising a ticket collection receptacle comprising:

a first ticket-receipt section defining a first ticket receiving slot, a second ticket-receipt section defining a second ticket receiving slot, and a third ticket-holding-and-access section defining a ticket retrieval slot, wherein the second ticket-receipt section and the third ticket-holding-and-access section comprise a plurality of walls formed from a sheet metal with a grain extending in an upright direction;

a ticket drawer column in the machine housing, the ticket drawer column comprising a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

2. The lottery ticket vending machine of claim 1, wherein the first ticket-receipt section comprises a downwardly extending angled ramp below the first ticket receiving slot.

3. The lottery ticket vending machine of claim 2, wherein the first ticket-receipt section comprises a downwardly angled wall spaced-apart from the ramp.

4. The lottery ticket vending machine of claim 2, wherein the first ticket-receipt section comprises a first rear wall and a second rear wall that partially define the first ticket receiving slot.

5. The lottery ticket vending machine of claim 4, wherein the second rear wall is directedly connected to the ramp.

6. The lottery ticket vending machine of claim 5, wherein the ramp is connected to a top portion and extends downwardly from an inner section of the second rear wall.

7. The lottery ticket vending machine of claim 6, wherein the ramp comprises an upper section that is angled away from the second rear wall.

8. The lottery ticket vending machine of claim 7, wherein the ramp comprises a lower section that is angled toward and extends toward the second rear wall.

9. The lottery ticket vending machine of claim 8, wherein the lower section of the ramp is spaced-apart from the second rear wall.

10. The lottery ticket vending machine of claim 8, wherein the upper section of the ramp and the lower section of the ramp are connected by a curved smooth intermediate section.

11. A lottery ticket vending machine comprising:

a machine housing comprising an openable front door, the front door comprising a ticket collection receptacle comprising:

a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, and a third top wall connected to and extending inwardly from the third front wall, the third top wall connected to and the first rear wall, and wherein the first rear wall is connected to extends downwardly from the third top wall;

a ticket drawer column in the machine housing, the ticket drawer column comprising a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

12. The lottery ticket vending machine of claim 11, wherein the second rear wall, the bottom wall, the first front wall, the first top wall, the second front wall, and the second top wall are formed from a sheet metal with a grain extending in an upright direction.

13. The lottery ticket vending machine of claim 12, wherein the first rear wall, the third top wall, and the third front wall are formed from a separate piece of sheet metal and attached to the second top wall.

14. The lottery ticket vending machine of claim 11, which comprises a downwardly extending angled ramp below the first ticket receiving slot.

15. The lottery ticket vending machine of claim 14, wherein the ramp is connected at a top portion and extends downwardly from an inner section of the second rear wall.

16. The lottery ticket vending machine of claim 15, wherein the ramp comprises an upper section that is angled away from the second rear wall.

17. The lottery ticket vending machine of claim 16, wherein the ramp comprises a lower section that is angled toward and extends toward the second rear wall.

18. The lottery ticket vending machine of claim 17, wherein the lower section of the ramp is spaced-apart from the second rear wall.

19. A lottery ticket vending machine comprising:

a machine housing comprising an openable front door, the front door comprising a ticket collection receptacle comprising:

a ticket-receipt section and a ticket-holding-and-access section that are formed by:

a first rear wall, a second rear wall spaced-apart from the first rear wall, the first rear wall and the second rear wall defining a first ticket receiving slot, a bottom wall connected to and extending outwardly from the second rear wall, a first front wall connected to and extending outwardly and upwardly from the bottom wall, a first top wall spaced-apart from the first front wall, the first front wall and the first top wall defining a ticket retrieval slot, the second front wall extending downwardly, a second front wall connected to and extending inwardly and upwardly from the first top wall, a second top wall connected to and extending inwardly from the second front wall, a third front wall connected to and extending inwardly and upwardly from the second top wall, a third top wall connected to and extending inwardly from the third front wall, the third top wall connected to and the first rear wall, and wherein the first rear wall is connected to extends downwardly from the third top wall, and a downwardly extending angled ramp below the first ticket receiving slot, wherein the ramp is connected at a top portion and extends downwardly from an inner section of the second rear wall, the ramp comprises an upper section that is angled away from the second rear wall, and the ramp comprises a lower section that is angled toward and extends toward the second rear wall;

a ticket drawer column in the machine housing, the ticket drawer column comprising a plurality of ticket drawers, each of the ticket drawers configured to hold a pack of lottery tickets; and a ticket burster in the machine housing, the ticket burster defining a ticket inlet and a ticket outlet, the ticket burster movable to a plurality of different ticket receipt positions, each different ticket receipt position associated with and in alignment with a different one of the ticket drawers, the ticket burster movable to a ticket dispense position adjacent to the ticket collection receptacle and such that the ticket outlet of the ticket burster is aligned with the first ticket receiving slot of the ticket collection receptacle.

20. The lottery ticket vending machine of claim 19, wherein the first rear wall, the third top wall, and the third front wall are formed separately from and attached to the second top wall.

* * * * *